United States Patent

[11] 3,582,551

[72] Inventor Robert W. Krug
Janesville, Wis.

[21] Appl. No. 757,858
[22] Filed Sept. 6, 1968
[45] Patented June 1, 1971
[73] Assignee Zenith Radio Corporation

[54] TELEVISION RECEIVER NOISE IMMUNE AUTOMATIC GAIN CONTROL AND SYNC SEPARATOR CONTROL SYSTEM.
6 Claims, 1 Drawing Fig.

[52] U.S. Cl. ........ 178/7.3, 178/7.5
[51] Int. Cl. ........ H04(n) 5/56 H04(n) 5/12
[50] Field of Search ........ 178/6 NS, 7.3 S, 7.5 S, 7.3 DC

[56] References Cited
UNITED STATES PATENTS 3,005,870 10/1961 Ruby et al. ........ 178/7.3DC

*Primary Examiner*—Richard Murray
*Assistant Examiner*—George G. Stellar
*Attorneys*—John J. Pederson and Eugene M. Cummings

ABSTRACT: A noise-immune control system for a television receiver comprising a semidivided pentode having respective sections for AGC and synchronizing signal separator functions and a positively-biased noise-gating grid for interrupting both sections in the presence of signals in excess of a predetermined threshold level. Negative-polarity composite video signals including undesired impulse noise are applied to the gating grid via a DC coupling network to interrupt AGC and synchronizing signal separator action during the presence of noise impulses. A positive-polarity pulse is also applied via an AC only coupling network to the gating grid coincidentally with the c the composite video signal to prevent the AGC section from being cutoff and the receiver from becoming paralyzed should the composite video signal applied to the gating grid momentarily exceed the threshold level, as when switching from a weak channel to a strong channel because of the finite time constant of the receiver ACT GC system.

PATENTED JUN 1 1971 3,582,551
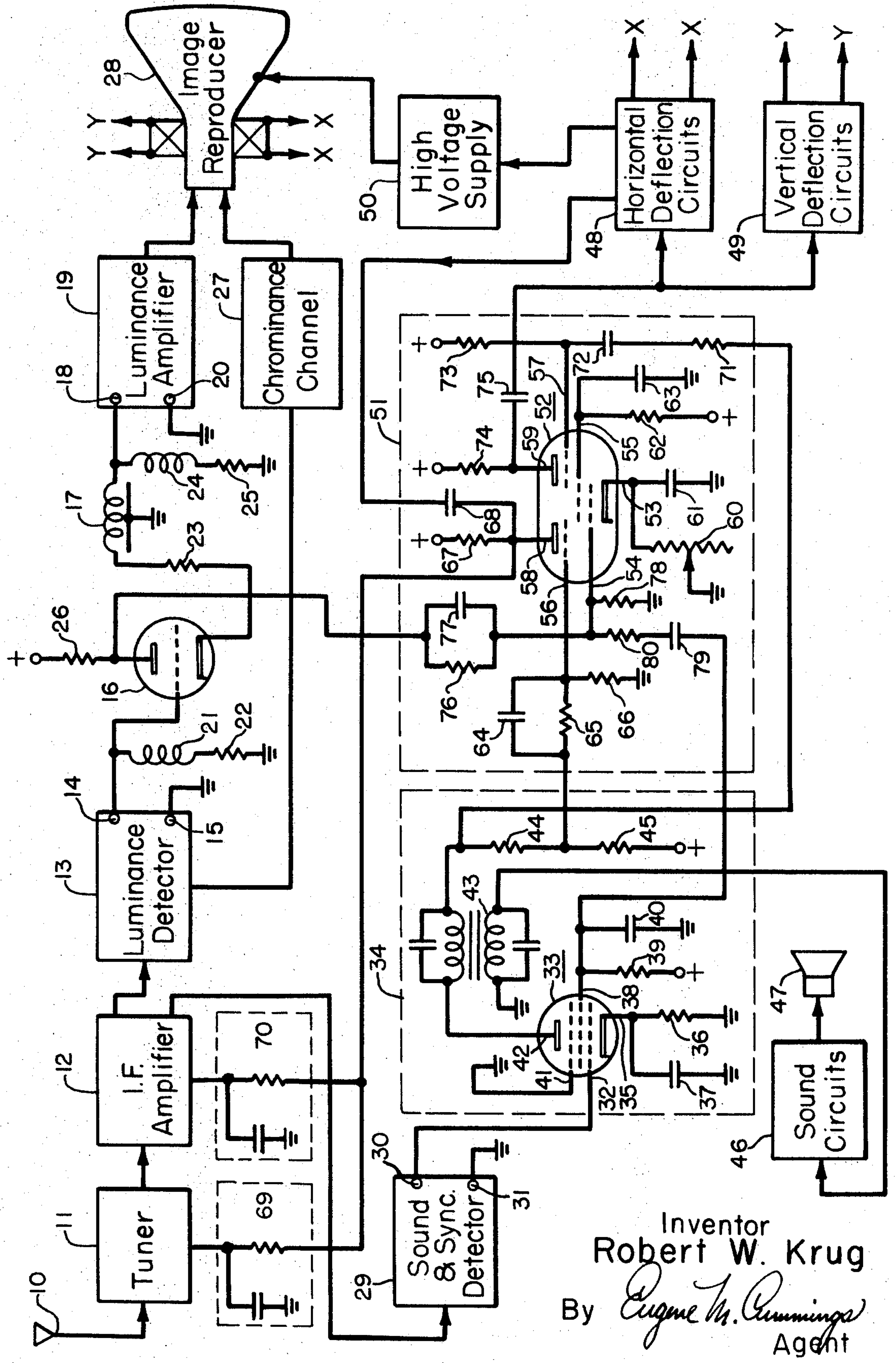
Inventor
Robert W. Krug
By Eugene M. Cummings
Agent

TELEVISION RECEIVER NOISE IMMUNE AUTOMATIC GAIN CONTROL AND SYNC SEPARATOR CONTROL SYSTEM

BACKGROUND OF THE INVENTION

This invention relates to a new and improved control system for a television receiver, and more particularly to an automatic gain control and synchronizing signal separation system having improved noise immunity.

Impulse noise has long been a source of difficulty in the operation of television receivers, particularly in weak signal or so-called fringe areas. The noise pulses, which are generally of very short duration but of substantially greater amplitude than the synchronizing signal components of the composite video signal, often cause improper AGC action and false synchronization of the scanning circuits of the television receiver. These difficulties have been overcome to a substantial extend in many commercial television receivers by employing noise immune AGC and synchronizing signal separator systems. Such systems generally achieve noise immunity by applying negative polarity composite video signals to a control grid biased sufficiently positive so that only the noise pulses in the composite signal are of sufficient amplitude to interrupt operation of the system. By thus eliminating noise pulses in the output of the AGC and sync separator stage, substantially stable operation of the line and field scanning systems of the receiver is achieved.

A particularly attractive noise immune sync separating system of this type combined with a noise immune AGC system is described and claimed in U.S. Pat. No. 2,915,583 to Robert Adler et al., which is assigned to the present assignee. In this system, which accomplishes both AGC and synchronizing functions in respective halves of a semidivided pentode, a negative polarity composite video signal obtained from the receiver luminance detector is applied via an AC coupling network to a control grid common to the two halves of the tube to allow noise pulses to interrupt or gate both functions simultaneously.

Under normal operating conditions the strength of the received signal can be expected to vary over a certain range and the sync separator system must be capable of accommodating that range. In the above-mentioned Adler et al. arrangement, the range is accommodated by a manually adjustable impedance which varies the amount of positive bias applied to the noise-gating grid and hence the amplitude of detector signal necessary to gate the pentode. This impedance is normally adjusted so that the required amplitude is slightly larger than the largest composite video signal expected at the video detector, so that only noise pulses have any gating effect. It has been found however, than when such a noise-gated system is adjusted for maximum noise protection under weak signal conditions, the AGC system may become paralyzed, or split-phased, when an abnormally large detector output signal suddenly appears, as when the receiver is tuned from a weak signal channel to a strong signal channel, because of the finite time constant of the receiver AGC circuitry. This split-phase condition occurs because the composite video signal is itself sufficiently strong to gate the AGC and sync clipper pentode. This disables the AGC system and causes the intermediate frequency amplifier stages of the receiver to operate at maximum gain, which in turn causes the composite video signal to remain at a sufficiently high amplitude to perpetuate the split-phase condition. Unfortunately, those circuit changes which would tend to decrease this tendency towards split-phase, such as decreasing coupling between the luminance detector and the noise-gating control grid or biasing the gating grid more positively, also tend to seriously degrade the noise immunity of the receiver.

Various improvements on the basic Adler et al. circuit have been developed to overcome this condition. In particular, U.S. Pat. No. 3,005,870 to Donald W. Ruby et al., which is also assigned to the present assignee, illustrates a circuit which alleviates the split-phase tendency by utilizing the screen grid of the video amplifier as a source of positive bias for the noise-gating grid. Since under strong signal conditions the luminance amplifier screen grid draws less current and becomes more positive, this arrangement causes the gating grid to be biased more positive during strong signal periods to offset the effect of the increased negative composite video signal applied to that grid from the video detector. A further improvement on this circuit, described and claimed in U.S. Pat. No. 3,235,659 to Walter W. Stroh, and also assigned to the present assignee, utilizes a voltage dependent resistor in the DC coupling path between the screen grid and gating grid to enhance the degree to which the gating grid becomes positive under strong signal conditions.

While the Stroh circuit has proven generally satisfactory, the advent of hybrid or partially transistorized television receiver circuitry. and more particularly transistorized intermediate frequency amplifier circuitry, has made it desirable in many instances to design receivers with low luminance detector output and with lower intermediate amplifier noise output capability. Attempts at maintaining the same standard of noise immunity when utilizing noise-gated AGC and sync clipper circuits such as the Stroh circuit in these receivers have centered on lowering the positive bias applied to the gating grid and on increasing the degree of AC coupling between the luminance detector and noise gating grid to couple a greater percentage of the available impulse noise to the grid for more effective gating. Unfortunately, these changes resulted in the receiver having an objectionable tendency to split-phase and therefore were largely unsatisfactory for use in production.

SUMMARY OF THE INVENTION

Accordingly, it is a general object of the present invention to provide a new and improved noise-immune AGC and sync separator system for a television receiver.

It is a specific object of the present invention to provide an AGC and sync separator system for a television receiver offering improved noise immunity.

It is a more specific object of the present invention to provide a new and improved noise immune AGC and sync separator system which does not split-phase under conditions of strong signal.

In accordance with the invention, a control system for a television receiver comprises means including a video detector for deriving from a received television transmission a composite video signal including AC and DC video components, synchronizing components and undesirable impulse noise components. The system further includes a time-gated automatic gain control system responsive only to the amplitude of the synchronizing components for maintaining the amplitude of the synchronizing components within a predetermined range regardless of fluctuations in the amplitude of the received transmission, the system including an electron-discharge device having a noise-gating grid for disabling the system during the presence of the impulse noise components to render the operation of the system substantially noise-immune, and the system further having a finite time constant which undesireably prevents it from maintaining the synchronizing components within the predetermined range during sudden increases in the amplitude of the composite signal. Means comprising a direct-current coupling network between the video detector and the noise-gating grid are included for applying to the grid the components of the composite video signal at a negative polarity, the means biasing the grid sufficiently positive to prevent the synchronizing components of the applied composite video signal from interrupting the operation of the gain control system, while allowing impulse noise and synchronizing components in excess of the range to do so. Further included is a positive-polarity voltage source having a potential directly related and substantially coincident with the absolute amplitude of the detected composite video signal. Means comprising an alternating current coupling network including a DC blocking capacitor between the source and the noise-gating grid are included for coupling as positive polarity pulses transitions in the voltage source accompanying sudden increases in the level of the composite video signal to prevent the automatic gain control system from becoming undesirably paralyzed by synchronizing components momentarily exceeding the threshold level due to the finite time constant of the AGC system.

BRIEF DESCRIPTION OF THE DRAWING

The features of this invention which are believed to be novel are set forth with particularity in the appended claims. The invention, together with further objects and advantages thereof, may best be understood by reference to the following description taken in conjunction with the accompanying drawing, which is a schematic diagram, partially in block form, of a television receiver incorporating a control system constructed in accordance with one embodiment of the invention.

DESCRIPTION OF THE PREFERRED EMBODIMENT

With the exception of certain detailed circuitry in its AGC and sync clipper section, the illustrated receiver is essentially conventional in design and accordingly only a brief description of its structure and operation need to be given here. A received signal is interrupted by an antenna 10 and coupled to a tuner 11, which includes conventional radio frequency amplifying and heterodyning stages for translating the signal to an intermediate frequency. After amplification by intermediate frequency (IF) amplifier 12 the signal is applied to a luminance detector 13, wherein luminance, chrominance and synchronizing information in the form of a composite video signal is derived.

The luminance component, which appears as a positive-polarity signal at detector output terminals 14 and 15, is applied to the control grid of a triode vacuum tube 16, which is connected as a cathode follower to translate this signal at a suitably low impedance level through a delay line 17 to one of the input terminals 18 of a luminance amplifier 19. Triode 16 also serves to invert the detector output signal developing at its anode a negative-polarity composite video signal which will be seen to be useful for noise-gating purposes. The remaining output terminal 15 of detector 13 and the other input terminal 20 of luminance amplifier 19 are grounded. Terminal 14 is returned to ground by the series combination of an inductance 21 and a resistor 22 which serves both as a detector load and as a video peaking network. Delay line 17 is terminated at its input end by the cathode impedance of triode 16 and a series-connected resistor 23 and at its output end by the series combination of a video peaking inductance 24 and a resistor 25 to ground. The anode of triode 16 receives operating power from the receiver B+ supply via a resistor 26.

The chrominance component of the composite video signal is coupled from detector 13 to a chrominance channel 27, which includes conventional chrominance amplification and demodulation circuitry for deriving control signals representative of the chrominance content of the transmitted image. The chrominance control signals are applied to a conventional trigun tricolor cathode-ray tube image reproducer 28 wherein they operate in conjunction with the amplified luminance signal from luminance amplifier 19 to produce an image having hue, color and saturation characteristics like those of the transmitted image.

The amplified intermediate frequency output signal from IF amplifier 12 is also coupled to a sound and sync detector 29 wherein a composite signal containing audio and synchronizing information is derived at terminals 30 and 31. Terminal 31 is grounded and terminal 30 is coupled to the control grid 32 of a pentode vacuum tube 33 in the receiver sound and sync amplifier stage 34. Operating bias is applied to the cathode 35 of pentode 33 by a cathode resistor 36, which is bypassed to ground at signal frequencies by a capacitor 37. The screen grid 38 of pentode 33 is connected to the receiver B+ supply by a screen dropping resistor 39 which is bypassed to ground by a capacitor 40. For reasons which will be explained later, these components are selected to allow the operating voltage on grid 38 to freely vary with signal level and especially to rise quickly following increases in received signal strength. Generally speaking, a low value of capacitance for bypass capacitor 40 and a relatively high value of resistance for screen dropping resistor 39 favor such rapid positive-polarity transitions.

The suppressor grid 41 of pentode 33 is grounded and the anode 42 receives operating power from the receiver B+ supply via an anode load circuit serially comprising the tuned primary of a 4.5 MHz. tuned coupling transformer 43 and a pair of resistors 44 and 45. The 4.5 MHz. intercarrier sound signal appearing across the secondary of transformer 43, which contains essentially only 4.5 MHz. intercarrier sound information, is coupled to the input of the receiver sound circuits 46 where conventional sound demodulation and amplification circuitry generates an audio output signal suitable for driving loudspeaker 47.

The television receiver further includes horizontal and vertical deflection circuits 48 and 49 for controlling the deflection of the electron beam across the image screen of image reproducer 28. Horizontal deflection circuit 48, which may be a conventional reaction-scanning type circuit, also provides operating power to a high voltage power supply 50 which generates the accelerating potential required by image reproducer 28.

To synchronize the operation of the deflection circuits and to maintain a substantially constant output signal level at detector 13, the receiver includes a combined AGC and sync clipper stage 51 in many respects similar to that of the previously mentioned Adler et al. patent. This stage utilizes an electron discharge device 52 in the form of a semidivided pentode vacuum tube having a cathode 53, a first control grid 54, a screen grid 55, a pair of additional individual control grids 56 and 57, and a pair of anodes 58 and 59 individually associated with control grids 56 and 57, respectively. Vacuum tube 52, commercially available as a type 6HS8, thus comprises two distinct and distinguishable electron discharge systems; an AGC system which includes electrodes 53—56 and 58, and a synchronizing signal separation system comprising electrodes 53—55, 57 and 59. The cathode 53, first control grid 54 and screen grid 55 are common to the two systems.

Cathode 53 is returned to ground through an adjustable resistor 60 which is bypassed at signal frequencies by a capacitor 61. This arrangement permits the cathode to be raised to a predetermined positive bias potential by adjustment of resistor 60. Screen grid 55 is connected to B+ by a screen dropping resistor 62.

Both the AC and DC components of the amplified positive-polarity composite video signal appearing across the anode load resistor 45 of sound and sync amplifier stage 34 are applied via a coupling network comprising a capacitor 64 and a pair of resistors 65 and 66 to the second control grid 56 of the AGC section of vacuum tube 52. Resistors 65 and 66 serve not only to couple the DC component of the sync and sound amplifier output signal to grid 56, but also as a source of DC bias to maintain the DC potential on this grid below that of cathode 53. This results in a clipping action which assures that only the peak amplitudes or synchronizing components of the composite video signal will affect AGC operation.

A positive potential is established on anode 58 by a resistor 67 connected between that electrode and B+. The anode potential resulting from this connection alone, however, is of such a low level that it does not in itself induce current flow to anode 58. Pulse excitation potential is also provided for anode 58 through an AC coupling system comprising a capacitor 68 which couples anode 58 to horizontal deflection circuit 48. With this energizing arrangement, the anode-cathode potential supports current flow to anode 58 only during the application of sync pulses to the anode, as in customary in time-gating practice. Consequently, the AGC system operates as a time-gated clipping amplifier and under normal operating conditions is conductive only during time intervals coincident with the synchronizing signal portions of the composite video signal.

The output signal from anode 58, which comprises pulses having an amplitude level determined by the amplitude of the synchronizing components of the composite video signal, is integrated by RC isolation networks 69 and 70 to develop gain control potentials suitable for application to gain controlling circuitry in tuner 11 and IF amplifier 12, respectively. Accordingly, the amplification level of amplifiers 11 and 12 is adjusted inversely in accordance with the received signal strength to maintain the level of the composite video signal and synchronizing components derived by luminance detector 13 within a relatively narrow predetermined range in spite of variations in received signal strength.

The AC component of the positive polarity composite video signal appearing at the output of sound and sync amplifier stage 34 is coupled via an AC coupling network serially comprising an isolation resistor 71 and a coupling capacitor 72 to the second control grid 57 of the sync section of vacuum tube 52. Grid 57 is also connected to B+ by a resistor 73 and the coupling impedances to this grid are selected to afford a self-bias potential which is slightly negative with respect to cathode 53, which causes this section of vacuum tube 52 to operate as a clipping amplifier and develop an output signal comprising pulses representative of the phase and frequency of the sync components of the composite video signal. The anode 59 of this section receives operating power from the receiver B+ supply via a resistor 74, and the output signal, or synchronizing control signal, appearing at this electrode is coupled through a capacitor 75 to the horizontal and vertical deflection circuits 48 and 49 to synchronize the phase and frequency of these circuits with the received television transmission.

In accordance with the invention, the AGC and sync separator system is afforded a very substantial degree of noise immunity by the provision of a novel noise-gating circuit for applying noise pulses derived at detector 13 to the first control grid 54, or noise-gating grid, of vacuum tube 52. In particular, grid 54 is AC and DC coupled to the anode of the luminance amplifier triode 16 by the parallel combination of a resistor 76 and a capacitor 77 and is returned to ground through a resistor 78. Resistors 76 and 78 together constitute a voltage divider for applying to grid 54 a fixed percentage of the DC potential present on the anode of triode 16, and since the potential on this electrode is inversely related to the potential developed at the output terminals 14 and 15 of luminance detector 13, grid 54 is effectively DC coupled to that stage. Components 77, 80, 79 and 40 provide a similar voltage divider for the AC signal present on the anode of triode 16.

Besides more efficiently coupling a greater percentage of noise to the grid 54, DC coupling grid 54 to the luminance detector overcomes a major drawback of previous AC coupled noise-gating circuits, namely variation of the bias level of the gating grid with changes in the average DC level of the video portion of the composite signal. As a result, the bias level can be maintained at a selected optimum level without having to allow for possible shift with video content. Capacitor 77 is included in the coupling network to avoid attenuation of the AC component of the composite signal by resistor 76. The relative values of resistors 76 and 78 are selected to maintain grid 54 sufficiently positive relative to cathode 53 so that the synchronizing components of the composite video signal will not cut off the stage, but the higher amplitude noise impulses will do so. Consequently, both sections of tube 52 are noise-gated, i.e., cut off by high amplitude noise contained in the received signal.

While time gating a noise-gated AGC and sync separation system affords a substantial advantage in that the AGC and synchronizing control signals are more effectively immunized from the effects of noise and changes in video modulation level, it is possible for such a system to split-phase, or become paralyzed, under circumstances in which the television receiver is suddenly switched from a weak station or vacant channel to a strong station. More particularly, paralysis of the system occurs in such a circumstance because of the finite response time of the receiver AGC system, which prevents the gain of the receiver tuner and IF amplifier stages from being immediately reduced by the AGC system to correspond to the increased signal strength. As a result, the synchronizing components of the composite video signal applied to control grid 54 by way of the noise-gating circuit are momentarily sufficiently negative to drive tube 52 into cutoff. When this occurs no AGC voltage is developed at anode 58, which being time-gated responds only to synchronizing components, causing the tuner and IF amplifier stages 11 and 12 to operate at maximum gain as if no signal were being received. This in turn causes the negative-polarity signal applied to noise-gating grid 54 to be even larger and thus even more effectively cutoff tube 52 to perpetuate the split-phase condition.

In further accord with the present invention, this condition is prevented by utilizing the positive-polarity transition experienced by a selected voltage source in the receiver as a result of the sudden increase in signal level to generate a positive-polarity pulse of sufficient amplitude to counteract the momentary increase in signal level and applying this pulse to the noise-gating grid 54. In the illustrated embodiment this is accomplished by an AC coupling network comprising a DC blocking capacitor 79 and an isolation resistor 80 serially connected between the screen grid 38 of pentode 33 and noise-gating grid 54. The potential on screen grid 38, it will be recalled, varies with variations in signal level, and by proper selection of resistors 39 and 80 and capacitors 40 and 79, this change is made to generate a pulse of sufficient amplitude and duration at grid 54 to raise the effective bias level of that grid momentarily above that which would allow the synchronizing pulses of the momentarily increased composite video signal to cutoff tube 52. The duration of the applied pulse is sufficient only to overcome the finite lag time of the receiver AGC system and therefore does not interfere with noise-gating action during periods of quiescent signal strength, as sometimes occurred with prior-art circuits which relied on a DC coupling path from the screen grid of the luminance amplifier and were therefore subject to DC drift with tube aging. Furthermore, with DC coupling between the luminance detector and noise-gating grid as contemplated by the present invention, an additional DC connection to another DC source would be very impracticable.

The described arrangement, besides coupling the noise-gating grid more tightly to the luminance channel to apply to that grid a greater portion of the detected noise signal, allows the parameters of the biasing circuit for grid 54 to be selected to provide optimum performance under weak signal conditions without fear that a sudden strong incoming signal will drive tube 52 into cutoff. For this reason, the performance of AGC and sync separator systems constructed in accordance with the invention has proven superior to that of previous systems, especially when employed in hybrid receivers in conjunction with transistorized IF amplifier stages where the available noise pulse amplitude may be substantially less than that of older vacuum tube type IF amplifiers.

In a combined AGC and sync separator system of the type herein considered, in which both functions are subject to a common control electrode, the control system of the invention has also proven useful in preventing loss of synchronism attributable to fluctuating signal strength conditions. Furthermore, the system is relatively simple and economical and requires a minimum of components, thereby materially enhancing the competitive position of the receiver in which it is included.

It will be appreciated that other coupling arrangements and pulse sources could be employed for applying the negative-polarity noise-gating gating signal and the counteracting positive-polarity pulse to the noise-gating grid during abrupt transitions in signal level. For instance, with additional circuitry the counteracting pulse could conceivably be derived from the anode circuit of pentode 33 rather than from the screen circuit, and the noise signal would be obtained by direct connection to a negative polarity luminance detector instead of at the anode of a cathode-follower triode 16, which serves to invert the positive-polarity detector output signal of the illustrated embodiment.

In order to afford a more complete and specific illustration of the invention, suitable circuit parameters for an AGC and sync separator control system constructed in accordance with the illustrated embodiment of the invention are set forth hereinafter. It will be appreciated that this material is included solely by way of illustration and in no sense by way of limitation.

| | | | |
|---|---|---|---|
| **V16** | 1/2 6KT8 | **R73** | 10 megohms |
| **V33** | 1/2 6KT8 | **R74** | 120,000 ohms |
| **V52** | 6HS8 | **R76** | 1 megohm |
| **R22** | 3,900 ohms | **R78** | 470,000 ohms |
| **R23** | 1,200 ohms | **R80** | 22,000 ohms |
| **R25** | 1,500 ohms | **C37** | 0.01 microfarads |
| **R26** | 33,000 ohms | **C40** | 4 microfarads |
| **R36** | 22 ohms | **C61** | 4 microfarads |
| **R39** | 33,000 ohms | **C63** | 0.1 microfarads |
| **R44** | 9,000 ohms | **C64** | 0.01 microfarads |
| **R45** | 1,200 ohms | **C68** | 470 picofarads |
| **R60** | 10,000 ohms | **C72** | 220 picofarads |
| **R62** | 15,000 ohms | **C75** | 0.01 microfarads |
| **R65** | 470,000 ohms | **C77** | 18 picofarads |
| **R66** | 47,000 ohms | **C79** | 0.01 microfarads |
| **R67** | 2.2 megohms | **L21** | 170 microhenries |
| **R71** | 22,000 ohms | **L24** | 42 microhenries |

While a particular embodiment of the present invention has been shown and described, it is apparent that changes and modifications may be made therein without departing from the invention in its broader aspects. The aim of the appended claims, therefore, is to cover all such changes and modifications as fall within the true spirit and scope of the invention.

I claim:

1. A control system for a television receiver comprising:

means including a video detector for deriving from a received television transmission a composite video signal including AC and DC video components, synchronizing components and undesirable impulse noise components;

a time-gated automatic gain control system responsive only to the amplitude of said synchronizing components for maintaining the amplitude of said synchronizing components within a predetermined range regardless of fluctuations in the amplitude of said received transmission, said system including an electron-discharge device having a noise-gating grid for disabling said system during the presence of said impulse noise components to render the operation of said system substantially noise-immune, and further having a finite time constant which undesirably prevents said system from maintaining said synchronizing components within said predetermined range during sudden increases in the amplitude of said composite signal;

means direct-current coupling said video detector to said noise-gating grid for applying the detector output signal to said grid with said components of said composite video signal at a negative polarity said last-mentioned means biasing said grid sufficiently positive to prevent synchronizing components within said predetermined range from interrupting the operation of said gain control system, while allowing impulse noise and synchronizing components in excess of said range to do so;

a positive-polarity voltage source having a potential directly related and substantially coincident with the absolute amplitude of said detected composite video signal;

and means comprising an alternating current coupling network including a direct-current blocking capacitor between said source and said noise-gating grid for coupling, as positive polarity pulses, transitions in said voltage source accompanying sudden increases in the level of said composite video signal to prevent said automatic gain control system from being undesirably paralyzed by synchronizing components momentarily exceeding said predetermined range due to said finite time constant of said AGC system.

2. A control system as described in claim 1 wherein said television receiver includes a vacuum tube amplifier for amplifying the sound and synchronizing components of said composite video signal, and said positive-polarity voltage source comprises the screen grid of this amplifier.

3. A control system as described in claim 1 wherein said composite video signal derived by said detector is of positive-polarity and said direct-current coupling means includes a cathode-follower stage coupled to the output of said video detector for inverting the polarity of said detector output signal as applied to said noise-gating grid.

4. A control system as described in claim 3 wherein said DC coupling network comprises a series-connected resistor between the anode of said cathode follower and said noise-gating grid.

5. A control system as described in claim 4 wherein said noise-gating grid is returned to ground by a resistor, that grid return resistor cooperating with said series coupling to form a voltage divider for maintaining said gating grid at a predetermined positive bias potential.

6. A control system as described in claim 5 wherein said positive-polarity voltage source comprises the screen grid of a vacuum tube amplifier included in said receiver for amplifying the sound and synchronizing components of said composite video signal, and said direct-current blocking capacitor in said alternating current coupling network is connected between said screen grid and said noise-gating grid.